United States Patent
Ouchi

(10) Patent No.: US 6,343,878 B1
(45) Date of Patent: *Feb. 5, 2002

(54) ROLLING BEARING UNIT WITH ROTATIONAL SPEED SENSOR

(75) Inventor: Hideo Ouchi, Fujisawa (JP)

(73) Assignee: NSK Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/583,577

(22) Filed: May 31, 2000

Related U.S. Application Data

(63) Continuation of application No. 09/167,982, filed on Oct. 8, 1998, now Pat. No. 6,089,757.

(30) Foreign Application Priority Data

Oct. 15, 1997 (JP) ............................................. 9-282313

(51) Int. Cl.⁷ ................................................. F16C 19/08
(52) U.S. Cl. ............................................................. 384/448
(58) Field of Search ........................................ 384/448, 446, 384/544, 513, 589

(56) References Cited

U.S. PATENT DOCUMENTS

| | | | |
|---|---|---|---|
| 4,778,286 A | * | 10/1988 | Kadokawa |
| 4,938,612 A | * | 7/1990 | Yamada |
| 5,018,384 A | | 5/1991 | Hayashi et al. |
| 5,183,341 A | | 2/1993 | Ouchi et al. |
| 5,195,831 A | | 3/1993 | Fayew et al. |
| 5,736,853 A | | 4/1998 | Rigaux |
| 6,109,793 A | | 8/2000 | Miyazaki |

FOREIGN PATENT DOCUMENTS

| | | |
|---|---|---|
| FR | 2 732 421 | 10/1996 |
| GB | 2 232 252 | 12/1990 |
| JP | 1-156464 | 10/1989 |
| JP | 3-115215 | 11/1991 |
| JP | 7-69335 | 7/1995 |
| JP | 2539381 | 4/1997 |

* cited by examiner

Primary Examiner—Lenard A. Footland
(74) Attorney, Agent, or Firm—Crowell & Moring, LLP

(57) ABSTRACT

A rolling bearing unit with a rotational speed sensor comprising a tone wheel 13a having a smaller cylindrical portion 15a fitted onto the fitting cylindrical face portion 23 in the middle portion of the inner ring 1 which is formed such that as the moment load is larger toward the flange 2a for the vehicle wheel, the cross sectional area of the inner ring 1 is larger toward the flange 2a.

1 Claim, 7 Drawing Sheets

ROLLING BEARING UNIT WITH ROTATIONAL SPEED SENSOR

This application is a continuation of application Ser. No. 09/167,982, filed Oct. 8, 1998, now U.S. Pat. No. 6,089,757.

THE BACKGROUND OF THE INVENTION

The present invention relates to a rolling bearing unit with a rotational speed sensor which rotatably supports a vehicle wheel of an automobile to a suspension and detects the rotational speed of the vehicle wheel so as to control the antilock brake system (ABS) and a traction control system (TCS).

Such a rolling bearing unit with a rotational speed sensor is disclosed for example in Japanese Utility Model First Publication No. H1-156464, and in French Patent First Publication No. 2732421.

FIGS. 6 and 7 shows a rolling bearing unit with a rotational speed sensor disclosed in French Patent First Publication No. 2732421. There is a first inner ring 1 which rotates with the vehicle wheel during use and called "hub". Formed on the outer peripheral surface at the axially outer end of the first inner ring 1 is a flange 2 with which the vehicle or road wheel is fixedly supported by the first inner ring 1.

Hereinafter, the term "axially outer" means the widthwise outer side when installed in the automobile, and left side in the drawings. On the contrary, the term "axially inner" means the widthwise central side when installed in the automobile, and right side in the drawings.

Formed on the outer peripheral surface at the axially middle portion of the first inner ring 1 is a first inner ring raceway 3, and formed on the outer peripheral surface at the axially inner end of the first inner ring 1 is a stepped portion 4 which is smaller in diameter than the first inner ring raceway 3.

Fitted on the stepped portion 4 is a second inner ring 6 on the outer peripheral surface of which a second inner ring raceway 5 is formed.

Provided around the first and second inner rings 1, 6 is an outer ring 7 which is not rotated during use.

Formed on the inner peripheral surface of the outer ring 7 are a first outer ring raceway 8 facing the first inner ring raceway 3 and a second outer ring raceway 9 facing the second inner ring raceway 5. In addition, formed on the outer peripheral surface of the outer ring 7 is a mount portion 10 which extends radially outward in a flange shape to mount the outer ring 7 to the suspension (not shown).

A plurality of rolling members 11a, 11b are provided between the first and second inner ring raceways 3, 5 and the first and second outer ring raceways 8, 9, respectively, so that the first and second inner rings 1, 6 are rotatably supported inside the outer ring 7. The rolling members 11a, 11b are rotatably held in a pair of cages 12.

Although balls are used for the rolling members in the examples illustrated, taper rollers can be used for the rolling members in the rolling bearing unit for a heavy automobile.

Provided between the cages 12 is a generally annular tone wheel 13 which is made of a magnetic material such as carbon steel and formed through a pressing process to have a larger cylindrical portion 14 with a larger diameter, a smaller cylindrical portion 15 with a smaller diameter and a connecting portion 16 to continuously and concentrically connect the larger cylindrical portion 14 and the smaller cylindrical portion 15 with each other.

Formed in the larger cylindrical portion 14 are a number of slit-like cutouts 17 which are arranged circumferentially with a uniform space therebetween and made axially long (left and right directions in the drawings). Accordingly, the magnetic property on the outer peripheral surface of the larger cylindrical portion 14 changes circumferentially alternately with a uniform interval.

The tone wheel 13 is mounted to the second inner ring 6 with the smaller cylindrical portion 15 fitted onto the outer peripheral surface at the axially outer end of the second inner ring 6 at a location spaced from the second inner ring raceway 5. In this state, the larger cylindrical portion 14 is located around the pair of cages 12.

On the other hand, formed in the axially middle portion of the outer ring 7 is a mount hole 18 which extends through the outer and inner peripheral surfaces of the outer ring 7 to insert the sensor 19 threrethrough. The sensor 19 has a detecting portion on its tip end face (lower end face in FIGS. 6 to 7).

In the state where the sensor 19 is fixedly inserted into the mount hole 18, the detecting portion faces through a clearance the outer peripheral surface of the larger cylindrical portion 14 of the tone wheel 13, so that when the first and second inner rings 1, 6 rotate, the output is changed corresponding to the change in magnetic property in the outer peripheral surface of the larger cylindrical portion 14.

When using the rolling bearing unit with the rotational speed sensor, the outer ring 7 is supported by the suspension while the vehicle wheel is fixed to the axially outer end of the first inner ring 1 at a location spaced from the outer ring 7 to support the vehicle wheel rotatably with reference to the suspension. When the tone wheel 13 rotates corresponding to the rotation of the vehicle wheel, the sensor 19 with its detecting portion facing the outer peripheral surface of the larger cylindrical portion 14 of the tone wheel 13 changes its output. The frequency at which the output of the sensor 19 changes is proportional to the rotational speed of the vehicle wheel. Accordingly, the output signal of the sensor 19 is sent through a harness 20 to the control devices to obtain the rotational speed of the vehicle wheel to properly control the ABS and the TCS.

In the conventional rolling bearing unit with the rotational speed sensor, it is difficult to secure the rigidity and simultaneously to make it compact and light weight. The reason is explained with reference to FIG. 2 showing an example of the embodiments of the present invention.

When using the rolling bearing unit to rotatably support the vehicle wheel, the moment load is applied to the first inner ring 1a in the direction to shift the central axis of the first and second inner rings 1a, 6a from the central axis of the outer ring 7a. The operating point of the moment load is located at the crossing point O between the central axis X of the first and second inner rings 1a, 6a and the extension line Y defining the contact angle $\theta$ associated with the axially inner rolling members 11b, the second inner ring raceway 5 and the second outer ring raceway 9. And, the moment load is applied to bend the first inner ring 1a based on the operating point at the crossing point O. This moment load is larger as the length L from the crossing point O is longer and equal to $L \cdot \cos\theta \cdot F$, where $\theta$ is the contact angle and F is the force to press the rolling constant surface of the rolling member 11b to the second inner ring raceway 5.

Accordingly, it is desirable to make small the axial size of the first inner ring 1a (make the distance L small) or to make the cross sectional area of the first inner ring 1a larger as it is away from the crossing point O in order to prevent the first inner ring 1a from being bent regardless of the moment load.

However, in the conventional structure as shown in FIGS. 6, 7, since the tone wheel 13 is securely fitted onto the axially outer end of the second inner ring 6, the axial length of the second inner ring 6 and therefore the axial length of the stepped portion 4 for fitting with the second inner ring 6 are large. As clear in FIGS. 6 and 7, the cross sectional area of the stepped portion 4 is small, and therefore it is undesirable from the point of securing the rigidity of the rolling bearing unit to make the axial length of the stepped portion 4 longer.

The axial length of the second inner ring 6 and the axial length of the stepped portion 4 might be made shorter in the conventional structure of FIGS. 6 and 7, and the tone wheel 13 might be securely fitted onto the outer peripheral surface of the middle portion of the first inner ring 1. However, in this case, the tone wheel 13 would easily interfere with any one of the cages 12, so it would be hard to use the structure in practice.

SUMMARY OF THE INVENTION

An object of the present invention is to provide a rolling bearing unit with a rotational speed sensor overcoming the problems as mentioned above.

Another object of the present invention is to provide a compact and light weight rolling bearing unit with rotational speed sensor where the rigidity of the first inner ring against the moment load is secured, while any interference between the tone wheel and the cages is avoided.

DETAILED DESCRIPTION OF THE PREFERRED EMBODIMENTS

Figure 1:
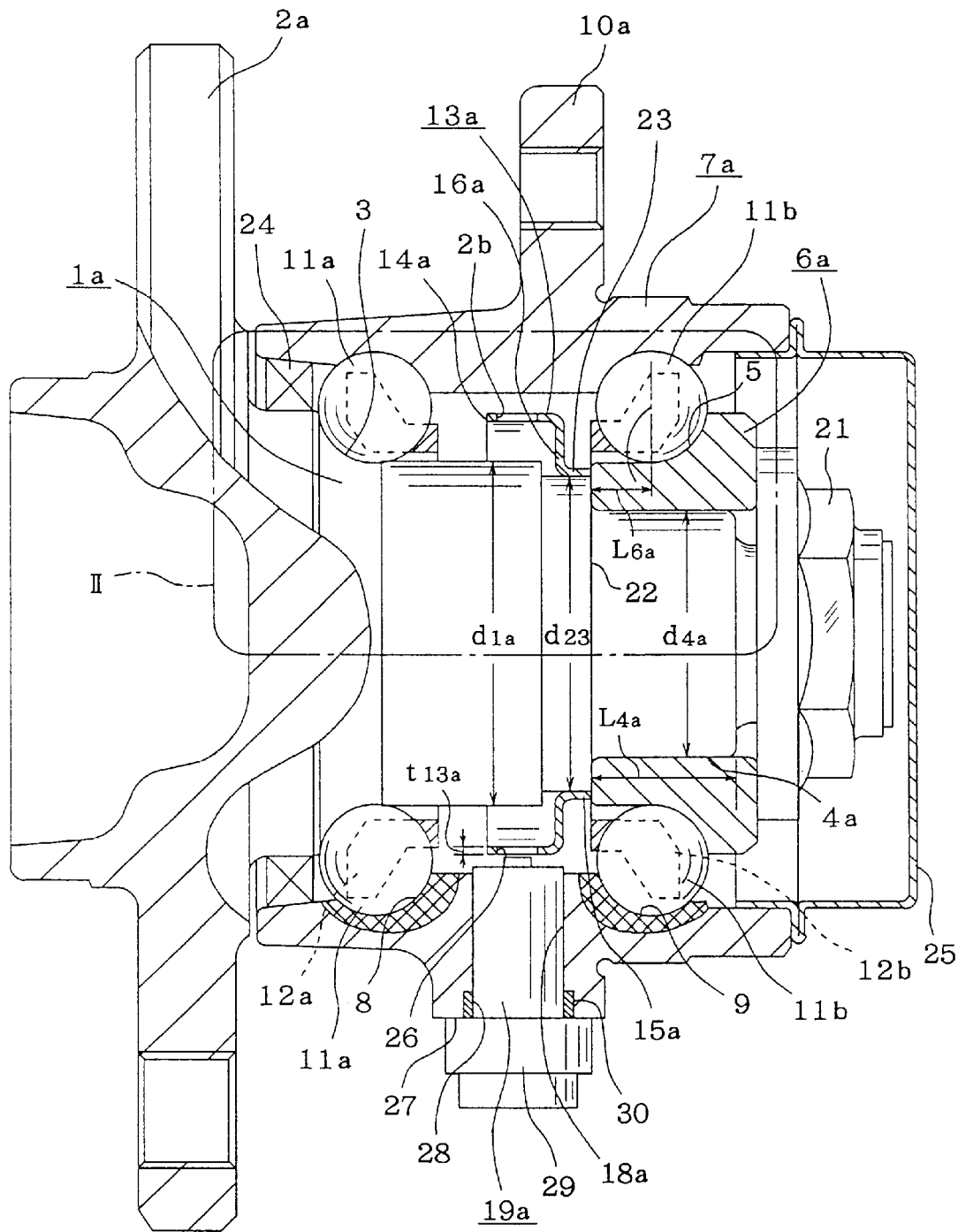
FIG. 1 is a cross sectional view of a first example of the embodiments of the present invention.

The rolling bearing unit with the rotational speed sensor of the present invention comprises, like the conventional bearing units, a first inner ring which rotates during use and has a flange formed on the outer peripheral surface at one axial end thereof to fixedly support a vehicle or road wheel with the first inner ring, a first inner ring raceway formed on the outer peripheral surface at a middle portion thereof and a stepped portion formed at the other end thereof with a smaller outer diameter than the outer diameter of the first inner ring raceway, a second inner ring fixedly fitted onto the stepped portion of the first inner ring and formed with a second inner ring raceway on its outer peripheral surface, an outer ring which does not rotate during use and has first and second outer ring raceways formed on the inner peripheral surface thereof to face the first and second inner ring raceways, respectively, a mount portion formed on its outer peripheral surface to connect the outer ring to the suspension and a sensor-mount hole formed in the axially middle portion, a plurality of rolling members provided between the first and second inner ring raceways and the first and second outer ring raceways, a pair of cages to hold the rolling members between the first and second inner ring raceways and the first and second outer ring raceways, respectively, a tone wheel arranged between the double rows of the rolling members and concentric with the first and second inner rings and comprising a larger cylindrical portion with a larger diameter, a smaller cylindrical portion with a smaller diameter, concentric with each other, and a connecting portion to continuously connect the larger and smaller cylindrical portions to each other such that the circumferential property of the outer peripheral surface of the larger cylindrical portion changes alternately with a uniform interval, and that the smaller cylindrical portion of the tone wheel is securely fitted onto the outer peripheral surface of the first inner ring in its middle portion at a portion between the first inner ring raceway and the stepped portion with the larger cylindrical portion of the tone wheel located on the side of the first inner ring raceway, and a sensor having a detecting portion and supported in the sensor-mount hole of the outer ring with the detecting portion facing the outer peripheral surface of the larger cylindrical portion of the tone wheel to output a signal changing corresponding to the change in property of the outer peripheral surface of the larger cylindrical portion.

In addition, the outer peripheral surface of the first inner ring in its middle portion has a portion adjacent the stepped portion, which is formed with a cylindrical fitting face portion which is larger in diameter than the stepped portion and smaller in diameter than the portion closer to the first inner ring raceway of the axially middle portion of the first inner ring, and the smaller cylindrical portion of the tone wheel is fixedly fitted onto the cylindrical fitting face portion of the first inner ring with interference fit.

In operation, the vehicle wheel is rotatably supported by the suspension, and the rotational speed of the vehicle wheel is detected as in a manner similar to the conventional rolling bearing unit with the rotational speed sensor.

In the rolling bearing unit of the present invention, the compatibility of being rigid and compact and lightweight can be achieved. Specifically, since the tone wheel is not fitted onto the second inner ring but on the outer peripheral surface of the first inner ring in its middle portion, the stepped portion with a small cross sectional area can be axially short in the first inner ring.

The cross sectional area of the first inner ring progressively increases from the stepped portion, through the cylindrical fitting portion toward the portion of the axially middle portion of the first inner ring closer to the first inner ring raceway, the rigidity against the moment load applied to the first inner ring can be sufficiently secured without increasing the volume of the first inner ring. In addition, the smaller cylindrical portion of the tone wheel is securely fitted onto the cylindrical fitting face portion smaller in diameter than the portion of the axially middle portion of the first inner ring closer to the first inner ring raceway, there is no interference between the smaller cylindrical portion of the tone wheel and the cages.

Figure 2:
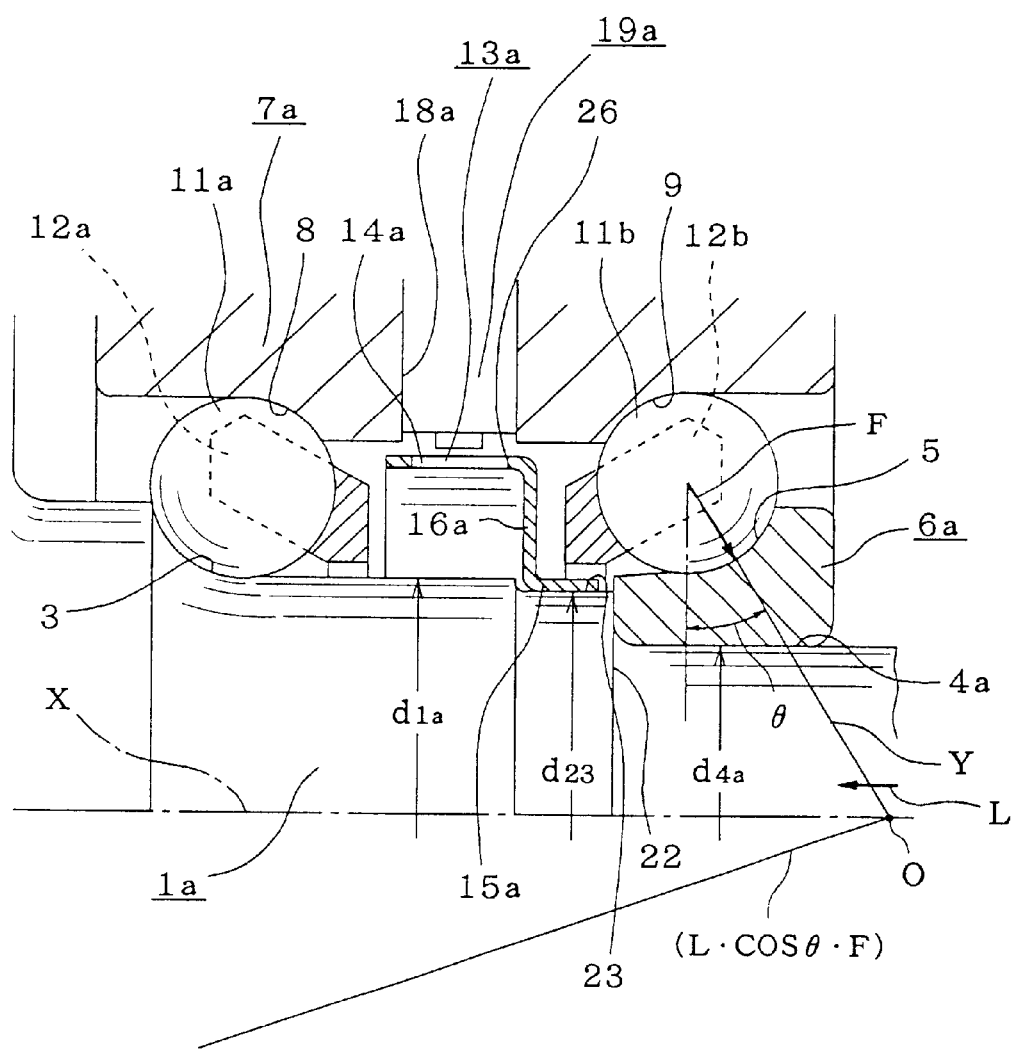
FIG. 2 is an enlarged view of the portion II of FIG. 1, partly changed.

Now, further explanation on the present invention is made with reference to a first example illustrated in FIGS. 1 and 2.

The rolling bearing unit with the rotational speed sensor of this example has a first inner ring or race 1a called "hub", a second inner ring or race 6a, an outer ring or race 7a, and a plurality of rolling members 11a, 11b which are balls in this example.

The first inner ring 1a is formed with a flange 2a on the outer peripheral surface thereof at its axially outer end to support a vehicle wheel. In addition, in the middle portion of the first inner ring 1a, a first inner ring raceway 3 is formed directly on the outer peripheral surface thereof.

Figure 6:
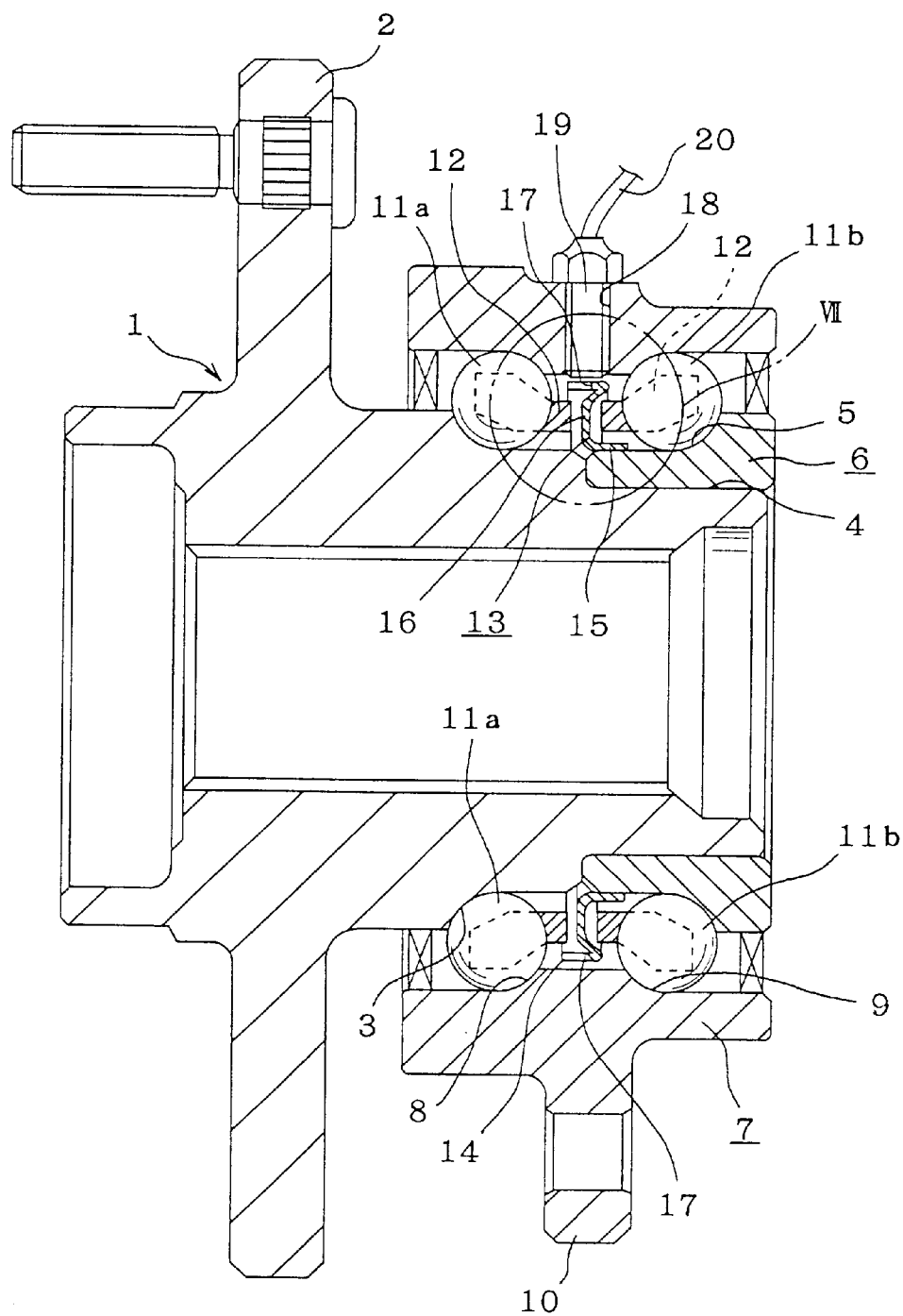
FIG. 6 is a cross sectional view of an example of the conventional structures.
Figure 7:
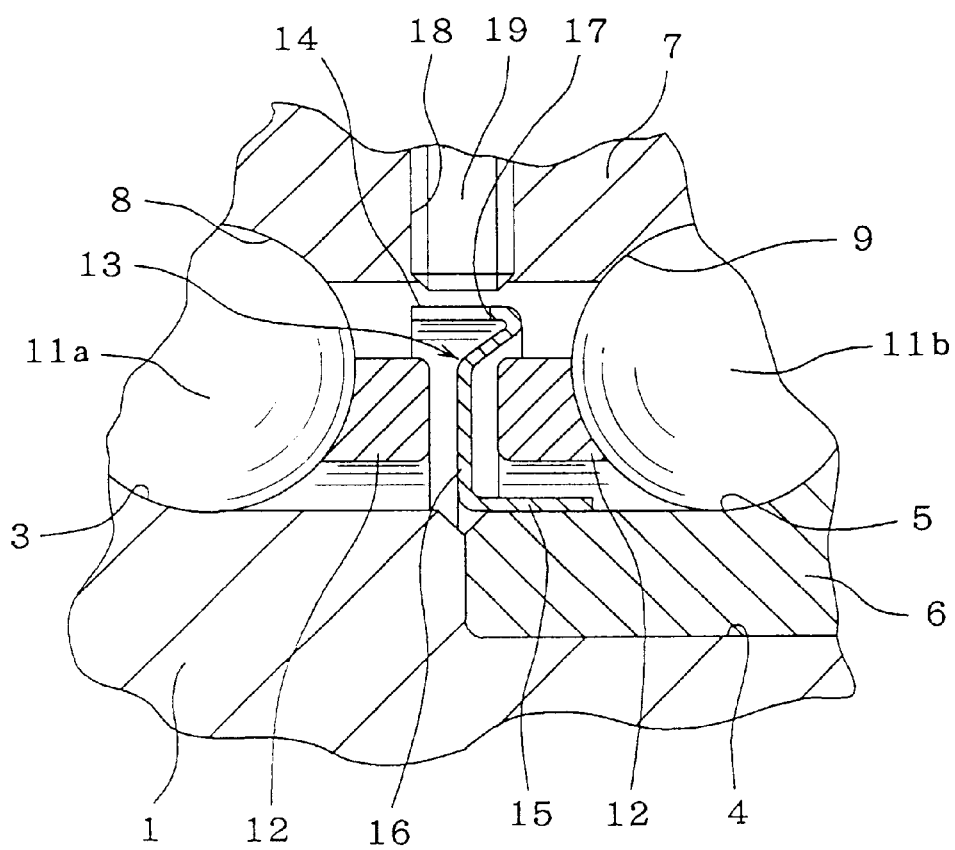
FIG. 7 is an enlarged view of the portion VII in FIG. 6.

The example illustrated discloses a rolling bearing unit for the non-driven wheel (the front wheel of the FR vehicle and of the RR vehicle, or the rear wheel of the FF vehicle), but this invention is not limited to it and can be applied to the rolling bearing unit for the driven wheel (the rear wheel of the FR vehicle and of the RR vehicle, or the front wheel of the FF vehicle, or the wheels of the 4WD vehicle). In the case of the rolling bearing unit for the driven wheel, the hub is made hollow and formed with spline grooves on its inner peripheral surface as shown in FIG. 6.

Provided at the axially inner end of the first inner ring 1a is a stepped portion 4a which is recessed radially inward from the outer peripheral surface of the first inner ring 1a and formed generally circumferentially concentric with the first inner ring 1a.

The second inner ring 6a is tightly fitted onto the stepped portion 4a, and formed with the second inner ring raceway 5 on its outer peripheral surface, and pressed to the stepped face 22 with a nut 21 to be fixed with reference to the first inner ring 1a.

In the middle portion of the first inner ring 1a, there is a portion of the outer peripheral surface adjacent the stepped portion 4a where a cylindrical fitting face portion 23 is circumferentially formed concentric with the first inner ring raceway 3. The cylindrical fitting face portion 23 is used for fittingly fixing the smaller cylindrical portion 15a of the tone wheel 13a described later.

Formed on the inner peripheral surface of the outer ring 7a are first and second outer ring raceways 8, 9 which face the first and second inner ring raceways 3, 5, respectively.

Induction hardening is applied to the portions of the inner peripheral surface of the outer ring 7a where the first and second outer ring raceways 8, 9 are formed (indicated by cross hatching in the lower half portion in FIG. 1), so that the hardened layer is generally circumferentially formed on the portions.

A plurality of rolling members 11a, 11b are provided between the first and second inner ring raceways 3, 5 and the first and second outer ring raceways 8, 9 and rotatably held in a pair of cages 12a, 12b, respectively, so that the first and second inner rings 1a, 6a are rotatably supported inside the outer ring 7a. Although balls are used for the rolling members in the examples illustrated, taper rollers can be used for the rolling members in the rolling bearing unit for a heavy automobile.

On the outer peripheral surface of the outer ring 7a closer to the axially inner end, there is a mount portion 10a extending outward like a flange shape to mount the outer ring 7a to a suspension (not illustrated).

A seal ring 24 is provided in the clearance between the axially outer end opening portion of the outer ring 7a and the outer peripheral surface in the middle portion of the first inner ring 1a for closing, while a cover 25 of a bottomed cylindrical shape is provided to close the axially inner end opening portion of the outer ring 7a.

The tone wheel 13a is fitted onto the cylindrical fitting face portion 23 formed on the outer peripheral surface of the middle portion of the first inner ring 1a, and concentric with the first inner ring 1a. The tone wheel 13a is made of a magnetic metal member such as steel plate and formed by drawing process, so that it is formed in a generally annular shape with the cross section in a crank shape.

The tone wheel 13a comprises a larger cylindrical portion 14a with a larger diameter, a smaller cylindrical portion 15a with a smaller diameter and an annular connecting portion for continuously connecting the axially inner end edge of the larger cylindrical portion 14a and the axially outer end edge of the smaller cylindrical portion 15a.

The tone wheel 13a is arranged between the rows of the rolling members 11a, 11b, and specifically the smaller cylindrical portion 15a is fitted onto the cylindrical fitting face portion 23 by way of interference fit with the larger cylindrical portion 14a located on the side of the first inner ring raceway 3. Accordingly, in the free state before the smaller cylindrical portion 15a is fitted onto the cylindrical fitting face portion 23, the inner diameter of the smaller cylindrical portion 15a is slightly smaller than the outer diameter of the cylindrical fitting face portion 23.

The difference between the diameter $d_{23}$ of the cylindrical fitting face portion 23 and the diameter $d_{1a}$ of the middle portion of the first inner ring 1a at a location closer to the first inner ring raceway 3 than the cylindrical fitting face portion 23 is desirably larger than two times the thickness $t_{13a}$ of the magnetic metal plate of the tone wheel 13a. That is $\{(d_{1a}-d_{23}) \geq 2t_{13a}\}$.

Accordingly, in the state where the smaller cylindrical portion 15a is fixedly fitted onto the cylindrical fitting face portion 23, the outer peripheral surface of the smaller cylindrical portion 15a never projects radially outward than the outer peripheral surface of the middle portion of the first inner ring 1a at the location closer to the first inner ring raceway 3 than the cylindrical fitting face portion 23. Therefore, not only in the case as shown in FIG. 1 where the pitch of the rows of the rolling members 11a, 11b is so large that the smaller cylindrical portion 15a and the axially inner cage 12b do not radially overlap each other, but also in the case as shown in FIG. 2 where the pitch of the rows of the rolling members 11a, 11b is so small that the smaller cylindrical portion 15a and the axially inner cage 12b radially overlap each other, there is no interference between the smaller cylindrical portion 15a and the cage 12b.

However, at least if the outer diameter of the smaller cylindrical portion 15a fixedly fitted onto the cylindrical fitting face portion 23 is smaller than the inner diameter of the cage 12b, the outer peripheral surface of the smaller cylindrical portion 15a can slightly project radially outward than the outer peripheral surface of the middle portion of the first inner ring 1a at the location closer to the first inner ring raceway 3 than the cylindrical fitting portion 23.

It should be noted that since the cages 12a, 12b are provided with axial play, in the case where the overlapping is caused when the cages 12a, 12b move about 1 mm even if there is no overlapping during incorporating, the outer diameter of the smaller cylindrical portion 15a must be smaller than the inner diameter of the axially inner cage 12b to avoid the interference between the axially inner cage 12b and the smaller cylindrical portion 15a.

Circumferentially formed with a uniform interval on the axially middle portion of the larger cylindrical portion 14a are through holes 26 by which the magnetic property of the outer peripheral surface of the larger cylindrical portion 14a is changed circumferentially alternately with a uniform interval.

It should be noted that the outer diameter of the larger cylindrical portion 14a is made as much as large, so that the peripheral speed of the larger cylindrical portion 14a is large to make large the change in the circumferential magnetic property, although any interference must be prevented between the outer peripheral surface of the larger cylindrical portion 14a and the inner peripheral surface of the outer ring 7a and the tip end face of the sensor 19a described later in the state where the tone wheel 13a is inserted into the outer ring 7a. The inner diameter of the cylindrical portion at the tip end of the detecting portion of the tone wheel 13a is larger in size than the outer diameter of the axially inner end face of the cage 12a, so that there is no interference in operation even if the cage 12a moves toward the tone wheel 13a by an amount equal to the engagement clearance between the cage 12a and the balls 11a to overlap the tone wheel 13a in a radial direction.

Provided in the axially middle portion of the outer ring 7a at a location radially outward than the larger cylindrical portion 14a is a sensor-mount hole 18a by which the inner and outer peripheral surfaces of the outer ring 7a are communicated with each other. It should be noted that the mount hole 18a is located between the hardened layers adjacent the first and second inner ring raceways 3, 5 separated from the hardened layers. Accordingly, the sensor-mount hole 18a can relatively easily formed and there is no need of using the elxpensive electro-discharging forming.

Fixedly inserted into the sensor-mount hole 18a is a sensor 19a which has a detecting element embedded in a synthetic resin block. The detecting element is provided on the tip end face (the upper end face in FIG. 1 and the lower end face in FIG. 2) of the sensor 19a to face the outer peripheral surface of the larger cylindrical portion 14a with a minute clearance therebetween.

In the condition where the sensor 19a is fixedly inserted into the sensor-mount hole 18a, the sensor 19a can detect the rotational speed of the tone wheel 13a.

Any type of the conventional structures can be used for the detecting element of the sensor 19a. For example, a combination of a permanent magnet for producing a flow of magnetic flux to the tone wheel 13a and an IC integrally comprising a magnetism detecting element such as magnetism resistance element (MR element) and Hall element and a waveshaping circuit can be generally used.

The sensor-mount hole 18a is desirably formed in a substantially horizontal location, in the rolling bearing, or specifically in a location at substantially right angles with respect to the direction of gravity. Since the sensor-mount hole 18a is formed on the opposite ends in the up and down directions of the outer ring 7a which are bitterly subject to the bending moment based on the vehicle weight and its acceleration, the strength of the outer ring 7a would be lowered. In other words, by placing the sensor-mount hole 18a at the substantially horizontal location where the strength problem can be avoided, the necessary strength of the outer ring 7a can be secured without increasing the thickness of material in the outer ring 7a.

On the outer peripheral surface of the outer ring 7a, a flat mount face 27 is formed around the opening at the outside end of the sensor-mount hole 18a such that the flat face 27 is orthogonal to the central axis of the sensor-mount hole 18a. And, a stepped portion 28 or a chamfered portion (not shown) which is recessed in a conical shape is formed at a continuation portion between the mount face 27 and the sensor-mount hole 18a.

A mount portion 29 is fixed to the base end portion (lower end portion in FIG. 1) of the sensor 19a, and securely connected to the outer ring 7a with a screw (not shown) inserted into the mount hole 40 (FIG. 5) of the mount portion 29. An O-ring 30 is fitted onto the base end portion of the sensor 19a, such that the O-ring 30 is elastically compressed between the mount portion 29 and the stepped portion 28 or the chamfered portion to seal the mount portion 29 of the sensor 19a to prevent the foreign matter such as rain water from entering the outer ring 7a through the sensor-mount hole 18a.

In the case of the rolling bearing unit with the rotational speed sensor, the vehicle wheel fixed to the flange 2a at the axially outer end of the first inner ring 1a is rotatably supported with reference to the suspension connected to the outer ring 7a.

As the tone wheel 13a fixed onto the first inner ring 1a rotates corresponding to the rotation of the vehicle wheel, the through holes 26 in the axially middle portion of the larger cylindrical portion 14a and the column portions between the adjacent through holes 26 alternately pass by the detecting portion at the tip end face of the sensor 19a. As a result, the density of the magnetic flux through the sensor 19a and the output of the sensor 19a change. The frequency at which the output of the sensor 19a changes is proportional to the rotational speed of the vehicle wheel. Accordingly, by sending the output of the sensor 19a to the control device (not shown), the ABS and TCS can properly controlled.

In the rolling bearing unit of the present invention, the compatibility of being rigid and compact and lightweight can be achieved. Specifically, since the tone wheel 13a is not fitted onto the second inner ring 6a but on the outer peripheral surface of the first inner ring 1a in its middle portion, the stepped portion 4a with a small cross sectional area formed in the first inner ring 1a can have a short axial length $L_{4a}$. Specifically, since the smaller cylindrical portion 15a of the tone wheel 13a is fixedly fitted onto the middle portion of the first inner ring 1a, the axial length $L_{6a}$ between the center of the rolling members 11b of the axial inner row and the axially outer end of the second inner ring 6a can be short by that amount, and the axial length $L_{4a}$ of the stepped portion 4a can be short.

In the first inner ring 1a, except for the threaded portion for engagement with the nut 21, the diameter $d_{4a}$ of the stepped portion 4a is the smallest, and the diameter progressively increases through the diameter $d_{23}$ of the cylindrical fitting face portion 23 to the diameter $d_{1a}$ of the middle portion of the first inner ring 1a closer to the first inner ring raceway 3 than the cylindrical fitting face portion 23. That is, $d_{4a} < d_{23} < d_{1a}$. Accordingly, the cross sectional area of the first inner ring 1a progressively increases from the stepped portion 4a through the cylindrical fitting face portion 23 to the axially middle portion of the first inner ring 1a closer to the first inner ring raceway 3.

As mentioned above, in the incorporation of the rolling bearing unit to the automobile, the moment load applied to the rolling bearing unit becomes larger axially outward from the crossing point O between the central axis X of the first and second inner rings 1a, 6a and the extension line Y of the contact angle associated with the axially inner rolling members 11b, the second inner ring raceway 5 and the second outer ring raceway 9. In the case of the rolling bearing unit with rotational speed sensor of the present invention, the cross sectional area of the portions in the first inner ring 1a is enlarged as the portions are subjected to a larger moment load. Therefore, without increasing the volume of the first inner ring 1a, the rigidity against the moment load applied to the first inner ring 1a can be sufficiently secured.

In addition, since the smaller cylindrical portion 15a of the tone wheel 13a is fitted onto the axial middle portion of the first inner ring 1a which is smaller in diameter than the portion closer to the first inner ring raceway 3, there is no interference between the smaller cylindrical portion 15a and the axially inner cage 12b. Accordingly, there is no need of making the interval (pitch) between the rolling members 11 in double rows larger than necessary to avoid interference between the smaller cylindrical portion 15a and the axially inner cage 12b. Then, the compact and lightweight rolling bearing unit with rotational speed sensor having a reduced axial size can be achieved.

Figure 3:
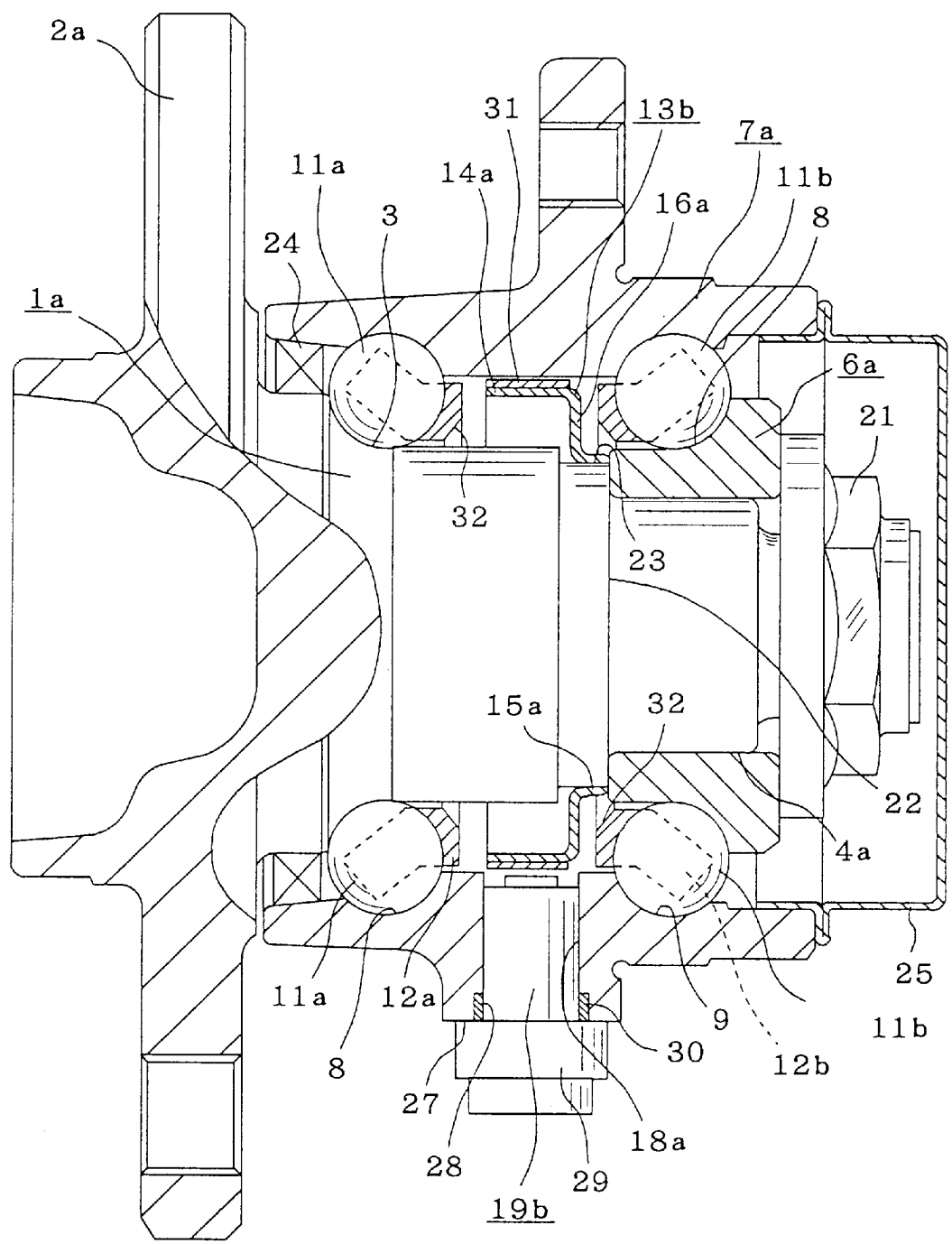
FIG. 3 is a cross sectional view of a second example of the embodiments of the present invention.

FIG. 3 shows a second example of the present invention, where the through holes etc. are not formed in the larger cylindrical portion 14a of the tone wheel 13b provided in the axially middle portion of the first inner ring 1a, and instead, the tone wheel 13b has a main body 31 which is attached into the outer peripheral surface of the larger cylindrical portion 14a.

The main body 31 of the tone wheel 13b is a permanent magnet such as a rubber magnet with ferrite powders mixed therein and formed in a generally cylindrical shape, which is radially magnetized with the magnetization direction circumferentially alternately changed with a uniform interval. Accordingly, S-poles and N-poles are alternately arranged with a uniform interval on the outer peripheral surface of the tone wheel 31.

Accordingly, in the present example, there is no need of the permanent magnet to be incorporated in the sensor 19b which is combined with the tone wheel 13b for the rotational speed detector.

In this example, the chamfered portion 32 is formed in part of the cages 12b, so that any interference is securely prevented from occurring between the axially inner cage 12b and the tone wheel 13b.

Specifically, the position relations between the components of the rolling bearing unit may change due to elastic deformation in the components during use. The chamfered portion 32 makes the distance between the axially inner cage 12b and the tone wheel 13b larger, so that even if the components are elastically deformed, the interference between the axially inner cage 12b and the tone wheel 13b is positively prevented.

Incidentally, it should be noted that the prevention of interference between the cages 12b and the tone wheel 13b is achieved not only by the chamfered portion 32 on the cage 12b but also by any other means. For example, a recess portion can be formed in the range where any interference may be caused in part of the cage 12b with the tone wheel 13b.

As shown in FIG. 3, the tip end portion of the smaller cylindrical portion 15a of the tone wheel 13b can be formed in a tapered shape such that the outer diameter is decreased toward its tip end edge. The other construction and function are substantially the same to those of the first example.

Incidentally, the sensor 19b in this example is made of synthetic resin through molding, such that the tip end of the sensor 19b does not project by a larger amount than 0.5 mm from the inner peripheral surface of the outer ring 7a. By making small the projection amount, the moment load applied to the sensor 19b is made slight even when the frozen particles of grease rotating together with the rolling members bump the sensor 19b during the start of vehicle at an extremely low temperature.

Figure 4:
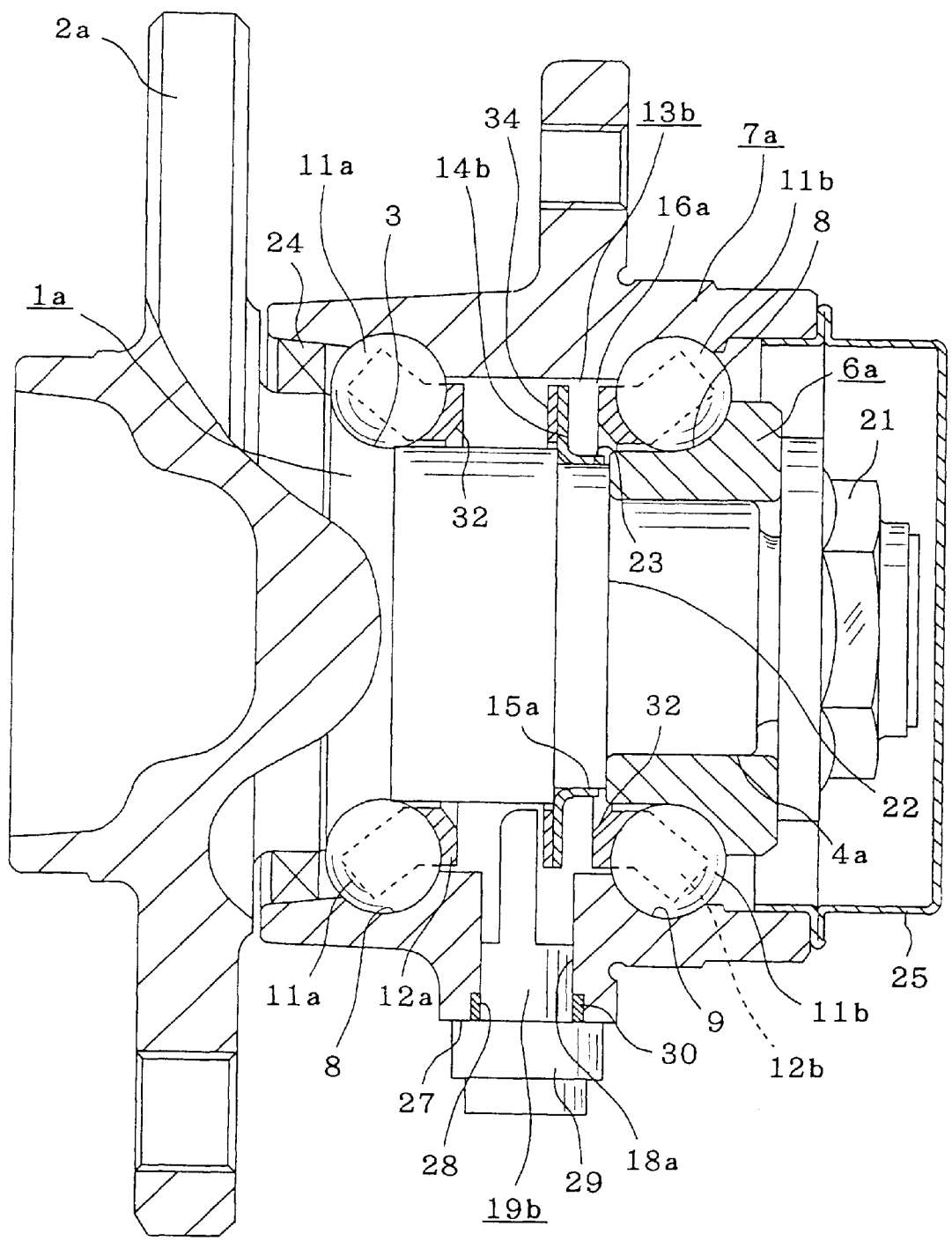
FIG. 4 is a cross sectional view of a third example of the embodiments of the present invention.
Figure 5:
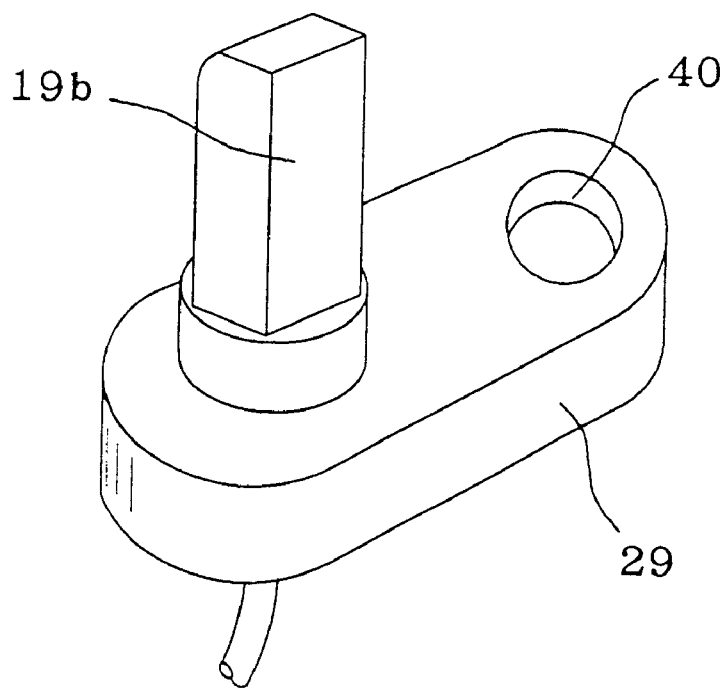
FIG. 5 is an enlarged perspective view of the sensor used in FIG. 4.

FIGS. 4 and 5 show a third example of the embodiments of the present invention, where the tone wheel is formed in a L-shape in cross section.

The tone wheel comprises a reinforcing metal made of steel plate with a L-shape in cross section to have a cylindrical portion 15a and a circular ring portion 14b, and a rubber magnet 34 with ferrite mixed therein is fixed to the circular ring portion 14b by way of seizure. The rubber magnet has one end face magnetized with N-poles and S-poles alternately with a uniform pitch in a circumferential direction.

The sensor 19b comprises an element to convert the magnetic flux to voltage or electric resistance and electronic parts, which are fixed on a base which is formed in a substantially rectangular shape. The side of the sensor 19b facing the encoder or detected portion of the tone wheel 13b is flat so that the air gap between the encoder and the element of the sensor 19b is small. The sensor 19b is fixed by way of a bolt which is inserted into the bolt hole 40 in the mount portion 29.

The present invention constructed and operated as mentioned above can achieve the compatibility of being rigid, compact and lightweight, decrease the automobile cost, and improve the riding comfortability,gt fuel consumption, acceleration and the other performances. A various kinds of rotational speed sensors can be applied to the rolling bearing unit of the present invention.

What is claimed is:

1. A rolling bearing unit with a rotational speed sensor comprising:

a first inner ring having one end portion formed with a flange, an outer peripheral surface formed with a first inner ring raceway, a stepped portion, and a fitting cylindrical face portion between the one end portion and the stepped portion having a diameter larger than a diameter of the stepped portion and smaller than a diameter of the one end portion, a second inner ring having an outer peripheral surface formed with a second inner ring raceway and fixedly fitted onto the stepped portion of the first inner ring, an outer ring having an outer peripheral surface formed with a flange, an inner peripheral surface formed with first and second outer ring raceways and a substantially radial hole formed between the first and second outer ring raceways, a plurality of rolling members provided between the first and second inner ring raceways and the first and second outer ring raceways to rotatably support the first and second inner rings, a cage for the rolling members in a row having an inner diameter, a tone wheel having a cylindrical portion which is made of a steel plate and fitted onto the fitting cylindrical face portion of the first inner ring, the cylindrical portion having an outer diameter smaller than the inner diameter of the cage, the tone wheel further having a detected portion, separate from the cylindrical portion, which has a circumferential magnetic property changing with a uniform pitch, and a rotational speed sensor inserted into the substantially radial hole of the outer ring and having a detected portion facing the detected portion of the tone wheel to detect the rotational speed of the inner rings.

* * * * *